(12) United States Patent
Nojiri et al.

(10) Patent No.: US 8,314,912 B2
(45) Date of Patent: Nov. 20, 2012

(54) LIQUID CRYSTAL DISPLAY DEVICE

(75) Inventors: Isao Nojiri, Tokyo (JP); Yasuo Fujita, Tokyo (JP); Hiroyuki Murai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 133 days.

(21) Appl. No.: 12/777,541

(22) Filed: May 11, 2010

(65) Prior Publication Data

US 2010/0289992 A1    Nov. 18, 2010

(30) Foreign Application Priority Data

May 15, 2009 (JP) ................................. 2009-118673

(51) Int. Cl.
G02F 1/1343 (2006.01)
(52) U.S. Cl. .......................................... 349/139; 349/106
(58) Field of Classification Search .................. None
See application file for complete search history.

(56) References Cited

U.S. PATENT DOCUMENTS

| | | | | |
|---|---|---|---|---|
| 5,734,457 A | * | 3/1998 | Mitsui et al. | 349/106 |
| 5,978,061 A | * | 11/1999 | Miyazaki et al. | 349/155 |
| 6,552,764 B2 | * | 4/2003 | Fujioka et al. | 349/106 |
| 6,633,353 B1 | | 10/2003 | Seki et al. | |
| 6,859,247 B2 | | 2/2005 | Murade et al. | |
| 7,199,855 B2 | | 4/2007 | Yoshimi et al. | |
| 7,292,293 B2 | | 11/2007 | Seki et al. | |
| 2002/0176030 A1 | * | 11/2002 | Matsumoto | 349/43 |
| 2005/0094061 A1 | * | 5/2005 | Lee et al. | 349/106 |
| 2009/0174695 A1 | | 7/2009 | Nojiri et al. | |

FOREIGN PATENT DOCUMENTS

| | | |
|---|---|---|
| JP | 11-281992 | 10/1999 |
| JP | 2000-321418 | 11/2000 |
| JP | 2001-108818 | 4/2001 |
| JP | 2001-147314 | 5/2001 |
| JP | 2001-222017 | 8/2001 |
| JP | 2002-189228 | 7/2002 |
| JP | 2009-128678 | 6/2009 |
| JP | 2009-163042 | 7/2009 |
| WO | WO 00/04417 | 1/2000 |
| WO | WO 2008/084568 A1 | 7/2008 |

OTHER PUBLICATIONS

Jin Young Choi, et al., "P-218L: Late-News Poster: A Compact and Cost-efficient TFT-LCD through the Triple-Gate Pixel Structure," SID 06 DIGEST, pp. 274-276, Year 2006.

* cited by examiner

*Primary Examiner* — Lucy Chien
(74) *Attorney, Agent, or Firm* — Oblon, Spivak, McClelland, Maier & Neustadt, L.L.P.

(57) ABSTRACT

Provided is a liquid crystal display device including contact hole parts in a gate line driving circuit, and light shielding layers formed of a metal material on a color filter substrate, where an insulating film is formed so as to cover the light shielding layer of the color filter substrate in a region on the array substrate, the area being opposed to the contact hole parts.

10 Claims, 7 Drawing Sheets

LIQUID CRYSTAL DISPLAY DEVICE

BACKGROUND OF THE INVENTION

1. Field of the Invention

The present invention relates to a liquid crystal display device, and more particularly, to a liquid crystal display device in which an amorphous TFT is used in a gate line driving circuit.

2. Description of the Background Art

An active matrix liquid crystal display device includes an array substrate in which a plurality of gate lines, a plurality of source lines and a gate line driving circuit are provided, and a color filter substrate which faces the array substrate. In the color filter substrate, a coloring pattern (red, green, blue) is provided on a glass substrate. Contrast of the liquid crystal display device decreases as a result of incident light leaking from a gap between coloring layers thereof, and accordingly, a light shielding layer for shielding light is formed therebetween. This light shielding layer is also provided in a periphery area other than the display area for preventing light leakage of a backlight. This light shielding layer is made of, for example, a resin material or a metal material. A light shielding layer made of a resin is formed by mixing a light shielding material such as carbon black into a resin material, and has a relatively low light shielding rate. Accordingly, a relatively large film thickness is required for achieving sufficient light shielding property. In contrast, a light shielding layer made of a metal material generally has a high light shielding rate, and thus is capable of sufficiently exerting light shielding property with a thin film. In addition, the light shielding layer made of a resin has a structural characteristic such as being relatively vulnerable to vibration and impact. Therefore, in terms of slimming down of an entire device and its reliability, it is desired to use a light shielding layer made of a metal material, not a light shielding layer made of a resin, in a liquid crystal display device.

Further, the color filter substrate includes a counter electrode formed of an indium tin oxide (ITO) film, and this ITO film and a light shielding layer are adjacent to each other, whereby the light shielding layer is supplied with the same potential as the counter electrode in a case where the light shielding layer is made of metal. The counter electrode is generally applied with approximately 5 V.

In an active matrix liquid crystal display device in which an amorphous silicon thin film transistor (hereinafter, referred to as "TFT") is used, as a gate line driving circuit (scanning line driving circuit) for scanning a liquid crystal display panel serving as a display part thereof, there is used a shift register which perform a shift operation in such a manner that one round is made during one frame period of a display signal. In order to reduce the number of processes in a process of manufacturing a liquid crystal display device, the shift register is desirably formed of the same conductivity type TFTs.

A liquid crystal display device in which a shift register of a gate line driving circuit is formed of TFTs is easily increased in area and has high productivity, and accordingly is used in a screen of, for example, a notebook PC, a personal digital assistant (PDA), a multimedia player (PMP) and a personal navigation device (PND) (see Jin Young Choi et al., "A Compact and Cost-efficient TFT-LCD through the Triple-Gate Pixel Structure", Society for Information Display, 2006, International Symposium Digest of Technical Papers, pp. 274-276).

The gate line driving circuit includes a large number of contact holes for connecting different types of metal interconnections. That is, the contact holes are provided for electrically connecting a first metal thin film and a second metal thin film which are formed on different layers. The contact holes include one formed on the first metal thin film and one formed on the second metal thin film, where bridge connection is provided between both contact holes with a conductive film (contact hole part).

As a conductive material for connecting metal interconnections in which openings are provided as contact holes, a transparent conductive film such as ITO is generally used.

In order to narrow a frame of a liquid crystal display panel, it is required to, in a gate line driving circuit, dispose a sealing area which is formed so as to surround a periphery of the liquid crystal display panel and a part thereof in such a manner that they overlap each other. Generally, a portion under the sealing area is susceptible to water infiltrating from the outside, impurities or the like.

In a case of a gate line driving circuit composed of TFTs, a signal amplitude of this circuit is large such that, for example, a High voltage is 24 V and a Low voltage is −6 V, and these voltages are applied to a conductive film which provides bridge connection between the contact holes. Further, approximately 5 V is normally applied to the counter electrode as described above, whereby a large voltage of approximately +10 V is applied to the counter electrode and the light shielding layer while the Low voltage is applied to the conductive film.

In a case where a liquid crystal display panel in which a metal material is used for the light shielding layer is operated in a high temperature and high humidity environment, the liquid crystal display panel is considerably affected by water, impurities or the like as described above. When the Low voltage is applied to the conductive film, electrolysis occurs between the light shielding layer of the color filter substrate and the conductive film connected to the contact hole which is formed at a seal end (on the liquid crystal side) or under the seal. Accordingly, the light shielding layer which faces the conductive film melts into the liquid crystal layer to be lost, leading to a problem of degrading display quality, such as light leakage.

SUMMARY OF THE INVENTION

An object of the present invention is to prevent melt-out of a light shielding layer, to thereby avoid a decrease in display quality.

A liquid crystal display device according to a first aspect of the present invention includes: an array substrate including a gate line driving circuit region; and a color filter substrate opposed to the array substrate, the array substrate and the color filter substrate being bonded to each other so as to sandwich a liquid crystal layer therebetween with a sealing member, the gate line driving circuit including contact hole parts, the color filter substrate including light shielding layers formed of a metal material, wherein at least a region opposed to the contact hole parts on the array substrate includes an insulating film formed so as to cover the light shielding layer of the color filter substrate.

A liquid crystal display device according to a second aspect of the present invention includes: an array substrate including a gate line driving circuit formed thereon; and a color filter substrate opposed to the array substrate, the array substrate and the color filter substrate being bonded to each other so as to sandwich a liquid crystal layer therebetween with a sealing material, the gate line driving circuit including contact hole parts, the color filter substrate including light shielding layers formed of a metal material, wherein: a region including the gate line driving circuit is divided into a region including the contact hole parts and a region free from the contact hole parts; and an end of the sealing material adjacent to the liquid crystal layer is disposed in the region free from the contact hole parts.

Employment of the configuration of the liquid crystal display device according to the present invention prevents melt-out of the light shielding layer of the color filter substrate, which avoids a decrease in display quality.

These and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, preferred embodiments of the present invention will be described with reference to the drawings. Note that components having the same or equivalent functions are denoted by the same reference symbols in the drawings for avoiding redundant overlapping description.

First Preferred Embodiment

Figure 1:
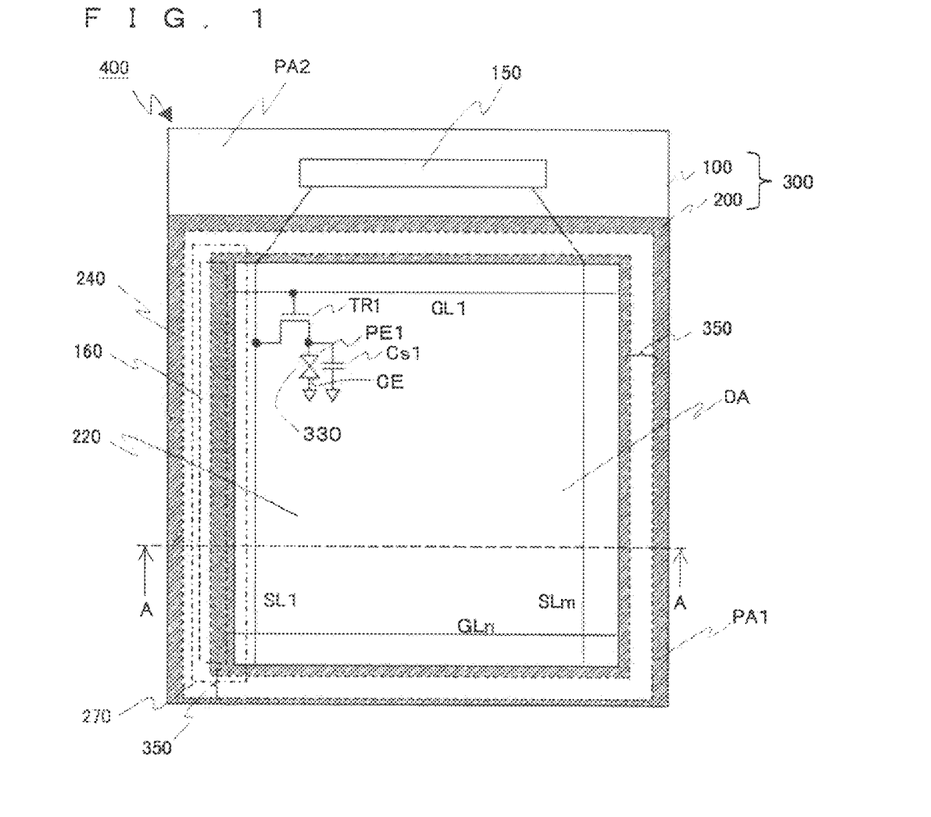
FIG. 1 is a plan view of a liquid crystal display device according to the present invention.
Figure 2:
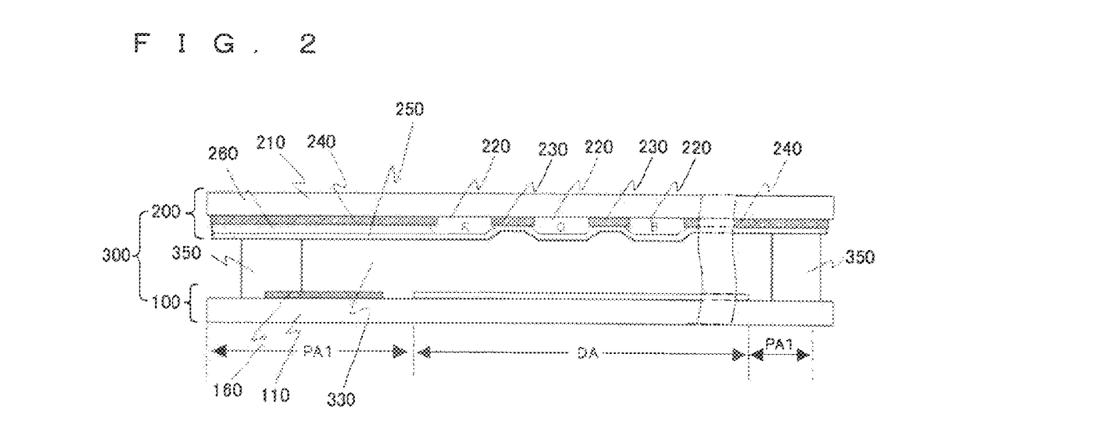
FIG. 2 is a cross-sectional view of a liquid crystal display device according to a first preferred embodiment.

FIG. 1 is a plan view of a liquid crystal display device 400 which displays an image on a liquid crystal display panel 300, and FIG. 2 is a cross-sectional view taken along the dashed line A-A of FIG. 1. As shown in FIG. 1, the liquid crystal display device 400 according to this preferred embodiment includes the liquid crystal display panel 300 in which a liquid crystal material is sandwiched between two substrates, a source line driver IC150 provided in the liquid crystal display panel 300 and a gate line driving circuit 160 formed on one of the substrates of the liquid crystal display panel 300 which respectively output driving signals to the liquid crystal display panel 300.

The liquid crystal display panel 300 will be described in more detail. As shown in FIG. 1 and FIG. 2, this liquid crystal display panel 300 includes an array substrate 100, a color filter substrate 200 which faces the array substrate 100, a liquid crystal layer 330 sandwiched between the array substrate 100 and the color filter substrate 200, and a sealing member 350 which holds the liquid crystal layer 330 to connect the array substrate 100 and the color filter substrate 200. The array substrate 100 includes a first substrate 110, a plurality of gate lines (GL1 to GLn) disposed on the first substrate 110, a plurality of source lines (SL1 to SLm) intersecting those gate lines so as to be insulated therefrom, a plurality of pixel electrodes PE disposed at intersecting parts of those lines, and TFTs for driving those pixel electrodes PE.

Outputs of the source line driver IC150 are respectively connected to the source lines (SL1 to SLm) to apply source driving signals to the source lines. In a similar manner, outputs of the gate line driving circuit 160 are respectively connected to the gate lines (GL1 to GLn) to apply gate driving signals to the gate lines. On a surface of the color filter substrate 200, which faces the array substrate 100, a counter electrode CE (250) is formed to control light transmittance of the liquid crystal layer 330 by an electric field generated between the pixel electrodes PE and the counter electrode CE. Further, between a drain electrode of the TFT and a common electrode (not shown), an auxiliary capacitor Cs is disposed for each pixel.

FIG. 1 particularly shows a connection diagram of a pixel electrode PE1, a TFT (TR1), the counter electrode CE and an auxiliary capacitor Cs1 which are disposed at an intersecting part of a first gate line GL1 and a first source line SL1 among a plurality of pixels arranged in matrix, correspondingly to a display area DA on which an image is displayed. The same holds true for other pixels (not shown).

The liquid crystal display panel 300 includes the display area DA, a first periphery area PA1 disposed so as to surround the display area DA, and a second periphery area PA2 externally adjacent to the first periphery area PA1.

As described above, on the first substrate 110 of the array substrate 100, the first to n-th gate lines GL1 to GLn and the first to m-th source lines SL1 to SLm are formed correspondingly to the display area DA.

Among the plurality of TFTs, a gate electrode and a source electrode of a first TFT (TR1) are electrically connected to the first gate line GL1 and the first source line SL1, respectively, and a drain electrode of the first TFT (TR1) is electrically connected to a first pixel electrode PE1 among the plurality of pixel electrodes and the first auxiliary capacitor Cs1.

The gate line driving circuit 160, which is formed simultaneously with the plurality of TFTs and the display area DA through the same process as those, is disposed on one side (left side in FIG. 1) of the first periphery area PA1 having a frame shape. Outputs of this gate line driving circuit 160 are electrically connected to the first to n-th gate lines GL1 to GLn formed in the display area DA. Gate line driving signals output from the gate line driving circuit 160 include first to n-th gate signals (OUT1 to OUTn), and the first to n-th gate signals are sequentially applied to the first to n-th gate lines GL1 to GLn.

The first substrate 110 is extended to be longer (upward in an example of FIG. 1) than a second substrate 210 in the second periphery area PA2, and the source line driver IC 150 is mounted thereon. Source line driving signals output from the source line driver IC150 include first to m-th source signals, and are respectively applied to the first to m-th source lines SL1 to SLm via a plurality of source line lead-out interconnections formed in the second periphery area PA2.

On the second substrate 210 of the color filter substrate 200, as shown in FIG. 2, a color filter layer 220 including red, green and blue pixels R, G and B and a first light shielding layer 230 formed between two adjacent pixels of colors among red, green and blue are disposed correspondingly to the display area DA. In addition, on the second substrate 210, a second light shielding layer 240 is disposed so as to be adjacent to the first light shielding layer 230, correspondingly to one side (left side in FIG. 1) of the first periphery area PA1 having a frame shape in which the gate line driving circuit 160 is disposed. The first light shielding layer 230 and the second light shielding layer 240 are formed by, for example, laminating layers of chromium oxide and chromium in order from the glass substrate 210.

Further, a color filter layer 260 is provided on the second light shielding layer 240 so as to cover this. The color filter layer 260 includes only red pixels, only green pixels, only blue pixels, or red, green and blue pixels, which is one type of an organic insulating film. FIG. 2 shows an example in which the color filter layer 220 of the red pixel R, including an area corresponding to the gate line driving circuit 160, is formed so as to extend in the sealing member 350 direction. A counter electrode 250 equivalent to the above-mentioned counter electrode CE of FIG. 1 is provided on the color filter layer 220, the first light shielding layer 230 and the color filter layer 260. The counter electrode 250 is provided for applying voltage to the liquid crystal layer 330 as the counter electrode CE corresponding to the pixel electrode PE, and a transparent conductive film of ITO or the like is used in this preferred embodiment.

The color filter substrate 200 and the array substrate 100 are disposed such that the surface on which the color filter layer 220 and the counter electrode 250 are formed and the surface on which the display area DA is formed are opposed to each other, and sandwich the liquid crystal layer 330 together with the sealing member 350 for fixing the two substrates to each other.

As described above, the color filter layer 260 is provided between the second light shielding layer 240 and the counter electrode 250, whereby the counter electrode 250 has a shielding effect with respect to the second light shielding layer 240. Accordingly, it is possible to prevent melt-out of a metal film serving as a light shielding layer of the color filter substrate. The color filter layer 260 is formed by extending the color filter layer 220 used in the display area DA to an area corresponding to the gate line driving circuit 160, and is capable of being formed simultaneously with the color filter layer 220. Therefore, a step of forming a new layer is not required, and a cost for the color filter substrate 200 is not increased.

Figure 3:
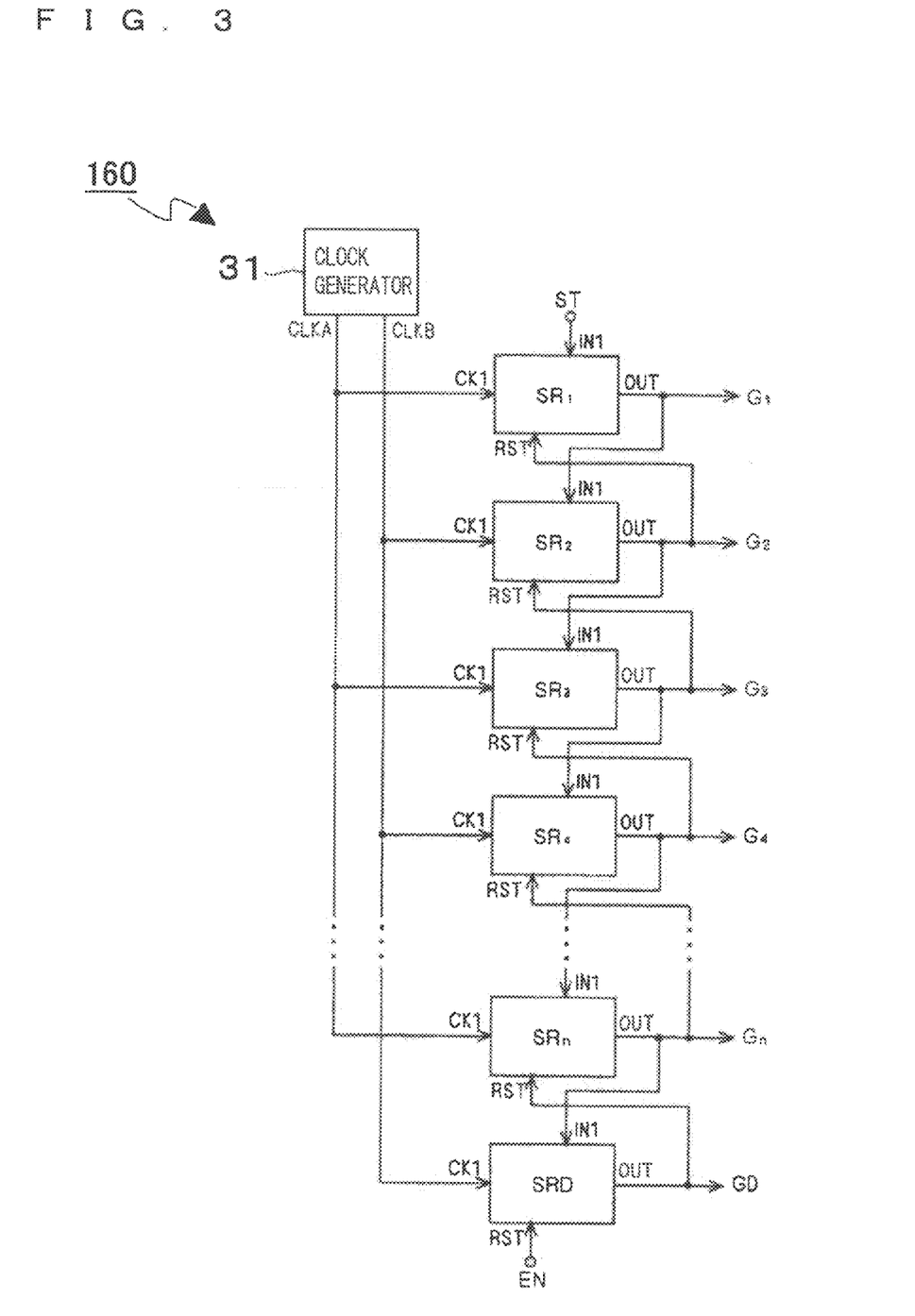
FIG. 3 is a configuration diagram of a shift register for a plurality of stages which constitute a gate line driving circuit according to the first preferred embodiment.
Figure 4:
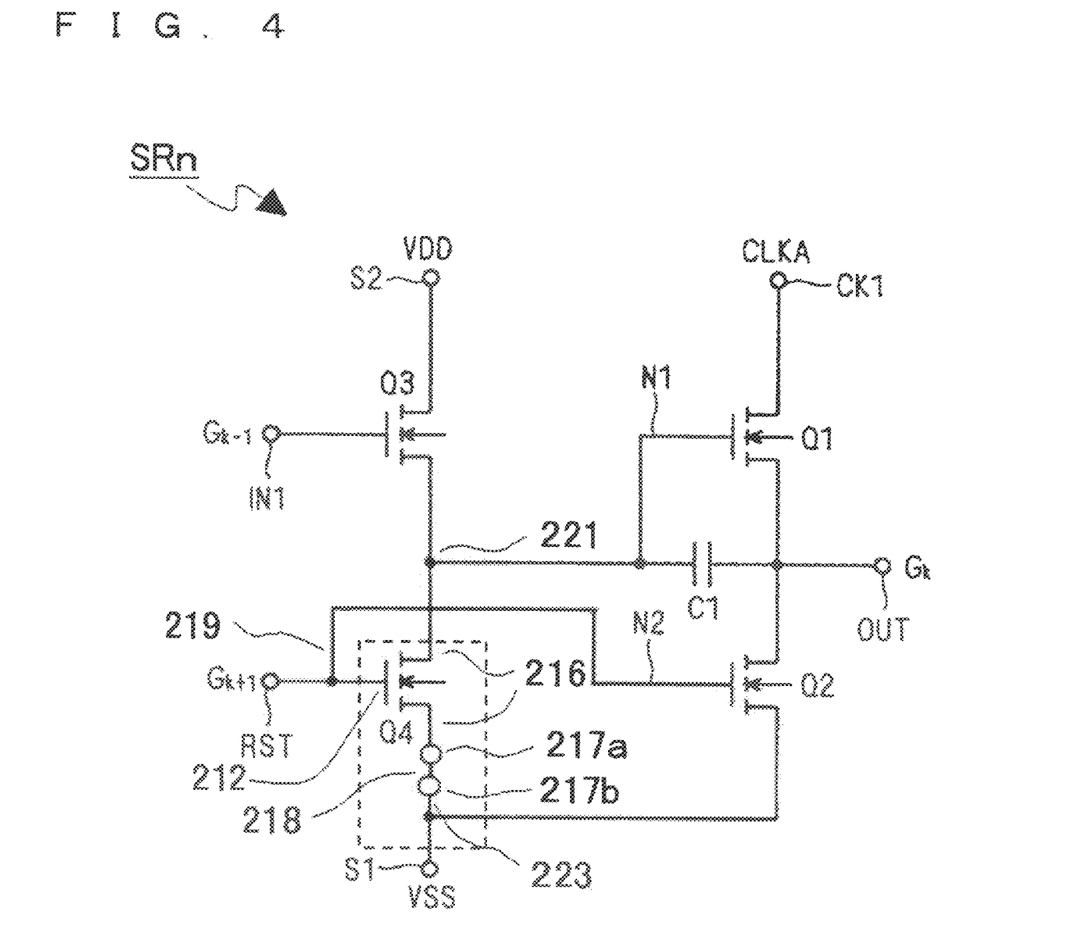
FIG. 4 is a circuit diagram showing a configuration the shift register for one stage which constitutes the gate line driving circuit according to the first preferred embodiment.

Next, a circuit configuration and an operation of the gate line driving circuit 160 will be described in detail with reference to FIG. 3 to FIG. 6. FIG. 3 shows a configuration of a shift register for a plurality of stages which constitute the gate line driving circuit. FIG. 4 is a circuit diagram showing a configuration of the shift register for one stage (unit shift register) which constitutes the gate line driving circuit. The shift register of FIG. 3 is composed of n unit shift registers SR1, SR2, SR3, ..., SRn in cascade connection and a dummy unit shift register SRD provided following a unit shift register SRn at the last stage (hereinafter, unit shift registers SR1, SR2, ..., SRn and SRD are collectively referred to as "unit shift registers SR"). Each of the unit shift registers SR is a circuit of FIG. 4.

A clock generator 31 shown in FIG. 3 supplies clock signals CLKA and CLKB having two phases opposite to each other (activation periods do not coincide with each other) to a plurality of unit shift registers SR. In the gate line driving circuit, those clock signals CLKA and CLKB are controlled so as to be activated in order at timings being in synchronization with a scanning cycle of the liquid crystal display device.

As shown in FIG. 3 and FIG. 4, each unit shift register SR includes an input terminal IN1, an output terminal OUT, a clock terminal CK1 and a reset terminal RST. In addition, each unit shift resister SR is supplied with a low-potential side power supply potential VSS (=0 V) via a first power supply terminal S1, and is supplied with a high-potential side power supply potential VDD via a second power supply terminal S2 (not shown in FIG. 3).

As shown in FIG. 4, an output stage of the unit shift register SRn is composed of a transistor Q1 connected between the output terminal OUT and the clock terminal CK1 and a transistor Q2 connected between the output terminal OUT and the first power supply terminal S1. That is, the transistor Q1 is a transistor (first transistor) which supplies the clock signal CLKA input to the clock terminal CK1 to the output terminal OUT, and the transistor Q2 is a transistor (second transistor) which discharges the output terminal OUT. Hereinafter, a node to which a gate (control electrode) of the transistor Q1 is connected is defined as a "node N1", and a node to which a gate of the transistor Q2 is connected is defined as a "node N2".

Provided between the gate and a source of the transistor Q1 (that is, between the node N1 and the output terminal OUT) is a capacitive element C1. The capacitive element C1 is an element (bootstrap capacitor) which provides capacitive coupling between the output terminal OUT and the node N1 to boost the node N1 in accordance with an elevation of level of the output terminal OUT. Note that the capacitive element C1 is capable of being replaced with a capacity between the gate and a channel of the transistor Q1 when the capacity is sufficiently large, and in such a case, the capacitive element C1 may be omitted.

Connected between the node N1 and the second power supply terminal S2 is a transistor Q3 whose gate is connected to the input terminal IN1. In addition, connected between the node N1 and the first power supply terminal S1 is a transistor Q4 whose gate is connected to the reset terminal RST. That is, the transistor Q3 constitutes a charging circuit which charges the node N1 in response to a signal input to the input terminal IN1, and the transistor Q4 constitutes a discharging circuit which discharges the node N1 in response to a signal input to the reset terminal RST. Moreover, the gate (node N2) of the transistor Q2 is also connected to the reset terminal RST.

As shown in FIG. 3, the output terminal OUT of the upstream unit shift register SR is connected to the input terminal IN1 of each unit shift register SR. However, a given start pulse ST is input to the input terminal IN1 of the unit shift register SR1 provided at the first stage. One of the clock signals CLKA and CLKB is input to the clock terminal CK1 of each unit shift register SR so as to be input with the clock signal of a phase different from phases of the adjacent upstream and downstream unit shift resisters SR.

The output terminal OUT of the downstream unit shift register SR is connected to the reset terminal RST of each unit shift register SR. However, a given end pulse EN is input to the reset terminal RST of the dummy unit shift register SRD provided following the unit shift resister SRn at the last stage. Note that in the gate line driving circuit, the start pulse ST and the end pulse EN are input at timings corresponding to a start and an end of each frame period of an image signal.

Next, an operation of each unit shift register SRn shown in FIG. 4 will be described. The unit shift registers SRn at respective stages basically operate in a similar manner, and thus description will be given here of an operation of a unit shift register SRk at a k-th stage of the multi-stage shift register, as an example. The clock signal CLKA is supposed to be input to the clock terminal CK1 of the unit shift register SRk (for example, the unit shift registers SR1 and SR3 of FIG. 3 correspond thereto).

Here, potentials of the clock signals CLKA and CLKB at H level are supposed to be VDD (high-potential side power supply potential), and potentials thereof at L level are supposed to be VSS (low-potential side power supply potential), where Vth (Qx) represents a threshold voltage of each transistor Qx constituting the unit shift resister SR.

Figure 5:
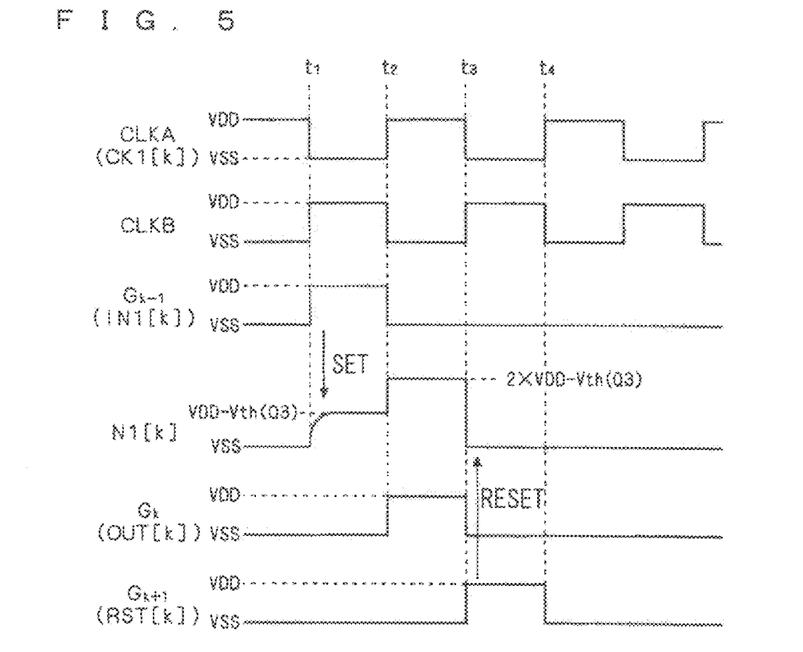
FIG. 5 is a timing chart showing an operation of a unit shift register according to the first preferred embodiment.

FIG. 5 is a timing chart showing the operation of the unit shift register SRk (of FIG. 4). First, it is assumed that a state in which the node N1 is at L level is an initial state of the unit shift register SRk (hereinafter, the state in which the node N1 is at L level is referred to as a "reset state"). In addition, it is assumed that the input terminal IN1 (output signal Gk−1 of a preceding stage), the reset terminal RST (output signal Gk+1 of a following stage) and the clock terminal CK1 (clock signal CLKA) are each at L level. The output terminal OUT is in a high impedance state (floating state) because the transistors Q1 and Q2 are turned off in this case, but it is supposed here that the output terminal OUT (output signal Gk) is also at L level in the initial state.

At a time t1, the clock signal CLKA changes from that state to the L level and the clock signal CLKB changes from that state to the H level, and an output signal Gk−1 of the preceding stage (start pulse ST in the case of the first stage) changes to the H level. As a result, the transistor Q3 of the unit shift register SRk is turned on, and the node N1 is charged to be at H level (hereinafter, the state in which the node N1 is at H level is referred to as a "set state"). In this case, a potential level (hereinafter, merely referred to as "level") of the node N1 rises to VDD−Vth (Q3). As a result, the transistor Q1 is turned on.

Then, at a time t2, the clock signal CLKB changes to the L level and the clock signal CLKA changes to the H level, and the output signal Gk−1 of the preceding stage changes to the L level. As a result, the transistor Q3 is turned off, and the node N1 changes to the floating state while being at H level. Further, the transistor Q1 is turned on, and thus the level of the output terminal OUT rises following the clock signal CLKA.

The levels of the clock terminal CK1 and the output terminal OUT rise, whereby the level of the node N1 is boosted as shown in FIG. 5 by coupling via the capacitive element C1 and the capacity between the gate and the channel of the transistor Q1. A boost amount on this occasion is approximately equivalent to an amplitude (VDD) of the clock signal CLKA, and thus the node N1 is boosted to approximately 2×VDD−Vth (Q3).

As a result, the voltage between the gate (node N1) and the source (output terminal OUT) of the transistor Q1 is kept large as well while the output signal Gk changes to the H level. That is, an on-resistance of the transistor Q1 is kept low, and thus the output signal Gk rises at high speed to be at H level following the clock signal CLKA. In addition, the transistor Q1 on this occasion operates in a linear region (non-saturated region), and thus the level of the output signal Gk rises to VDD which is the same as the amplitude of the clock signal CLKA.

Further, at a time t3, the on-resistance of the transistor Q1 is kept low also when the clock signal CLKB changes to the H level and the clock signal CLKA changes to the L level, whereby the output signal Gk falls at high speed following the clock signal CLKA to return to the L level.

In addition, at the time t3, the output signal Gk+1 of the following stage changes to the H level, whereby the transistors Q2 and Q4 of the unit shift register SRk are turned on. As a result, the output terminal OUT is sufficiently discharged via the transistor Q2 to be at L level (VSS) without fail. The node N1 is discharged by the transistor Q4 to be at L level. That is, the unit shift register SRk returns to the reset state.

Next, the output signal Gk+1 of the following stage returns to the L level at a time t4, and then the unit shift register SRk is kept to be in the reset state until the output signal Gk−1 of the preceding stage is input, and the output signal Gk is kept at L level.

To sum up the above-mentioned operation, the unit shift register SRk is in the reset state in a period in which the signal (start pulse SP or output signal Gk−1 of the preceding stage) is not input to the input terminal IN1, and the output signal Gk is kept at L level (VSS) because the transistor Q1 is kept in an off state. Then, the unit shift register SRk is shifted to the set state when the signal is input to the input terminal IN1. The transistor Q1 is turned on in the set state, and thus the output signal Gk is at H level while the signal (clock signal CLKA) of the clock terminal CK1 is changing to the H level. After that, the signal (output signal Gk+1 of the following stage or end pulse EN) is input to the reset terminal RST, whereby the unit shift register SRk returns to the original reset state.

Figure 6:
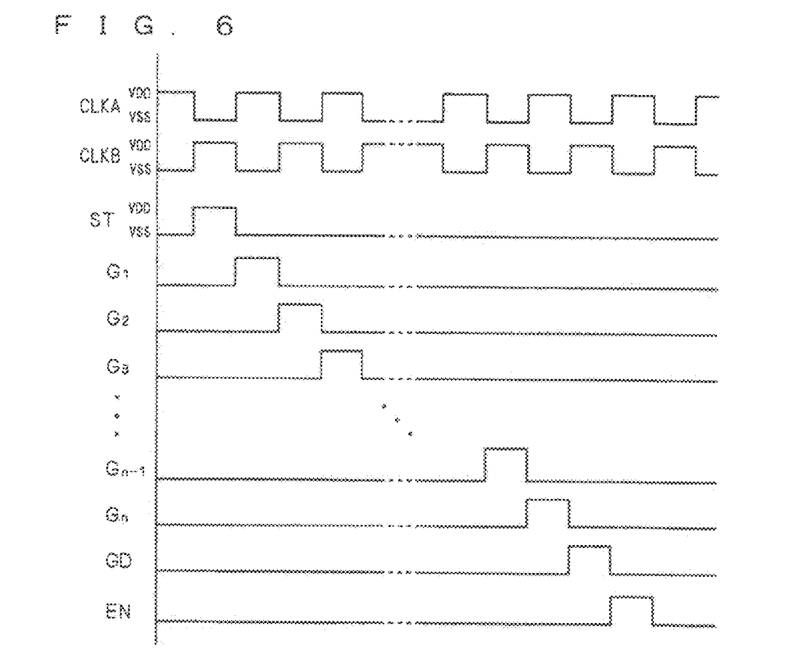
FIG. 6 is a timing chart showing an operation of a scanning line driving circuit of FIG. 3.

According to the multi-stage shift register composed of a plurality of unit shift registers SR which operate in this manner, when the start pulse ST is input to the unit shift register SR1 at the first stage, an output signal G is transmitted to the unit shift registers SR1, SR2, SR3, . . . , in order as shown in FIG. 6 while being shifted at timings in synchronization with the clock signals CLKA and CLKB, with the input of the start pulse ST being a trigger. In a gate line driving circuit, the output signal G output in order as described above is used as a horizontal (or vertical) scanning signal of a liquid crystal display panel.

Hereinafter, a period in which a specific unit shift register SR outputs the output signal G is referred to as a "selection period" of the unit shift register SR.

Note that the dummy unit shift register SRD is provided for bringing the unit shift register SRn into the reset state by an output signal GD immediately after the unit shift register SRn at the last stage outputs the output signal Gn. For example, in the case of the gate line driving circuit, if the unit shift register SRn at the last stage is not brought into the reset state immediately after the output signal Gn is output, a gate line (scanning line) corresponding thereto is unnecessarily activated, leading to a malfunction in display.

Note that the dummy unit shift register SRD is brought into the reset state by the end pulse EN input at the timing after the output signal GD is output. In a case where a shift operation of a signal is performed repeatedly as in the gate line driving circuit, a start pulse ST in the next frame period may be used in place of the end pulse EN.

In the case of driving with two-phase clock as in FIG. 5, each of the unit shift registers SR is brought into the reset state by an output signal G of its following stage, and thus a normal operation as shown in FIG. 5 and FIG. 6 cannot be performed before the unit shift register SR of the following stage operates at least once. Therefore, prior to the normal operation, a dummy operation for transmitting a dummy signal from the first stage to the last stage needs to be performed. Alternatively, a reset transistor may be separately provided between the reset terminal RST (node N2) and a second power supply terminal S2 (high-potential side power supply) of each unit shift register SR, to thereby perform a reset operation so as to compulsorily bring the node N2 into the H level before the normal operation. However, a reset signal line is additionally required in that case.

Figure 7:
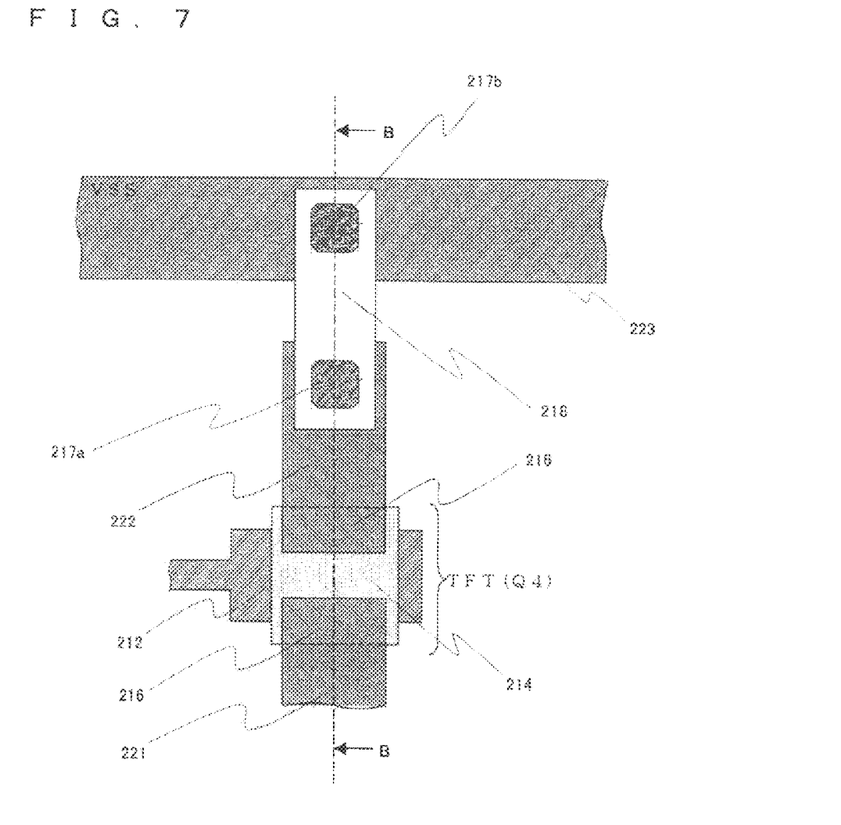
FIG. 7 is a plan view showing an enlarged circuit area of a part including a TFT in the gate line driving circuit according to the first preferred embodiment.
Figure 8:
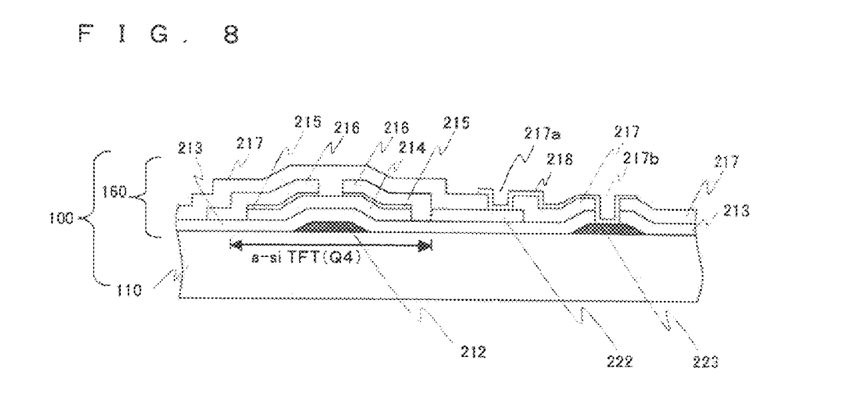
FIG. 8 is a cross-sectional view including contact hole parts of FIG. 7.

FIG. 7 is a plan view showing, in the gate line driving circuit 160 on the array substrate 100, an enlarged area (circuit surrounded by a dashed line of FIG. 4) corresponding to a part of a circuit including the TFT Q4. FIG. 8 is a cross-sectional view taken along the dashed line B-B in FIG. 7, which includes contact hole parts 217a and 217b which are main parts according to this preferred embodiment.

In FIG. 8, a gate electrode 212 formed of a metal conductive material (first metal thin film) is formed on the transparent first substrate 110 of the array substrate 100, and thereon, a gate insulating film 213 formed of a silicon nitride film (SiNx) or a silicon oxide film (SiO2) covers the gate electrode 212.

An active layer 214 formed of an amorphous silicon is formed on the gate insulating film 213 on the gate electrode 212, and an ohmic contact layer 215 formed of an amorphous silicon doped with impurities is formed thereon.

Source/drain electrodes 216 formed of a metal conductive material (second metal thin film) are formed on the ohmic contact layer 215. The source/drain electrodes 216 form the TFT (Q4) together with the gate electrode 212. Though not shown in FIG. 8, the gate electrode 212 is connected to a gate interconnection 219 which connects respective nodes of the gate line driving circuit (which is shown in FIG. 4). In a similar manner, one of the source/drain electrodes 216 is connected to a source/drain interconnection 221 which connects respective nodes of the gate line driving circuit (which is shown in FIG. 4).

A protective layer 217 formed of a silicon nitride film, a silicon oxide film or an organic insulating film is formed on the source/drain electrodes 216. The protective layer 217 includes the contact hole parts 217a and 217b from which the source/drain interconnection and the gate interconnection are exposed.

A transparent conductive film 218 is formed on the protective layer 217, and the transparent conductive film 218 provides bridge connection, via the contact hole parts 217a and 217b, between a gate interconnection 223 and a source/drain interconnection 222 extended from the other of the source/drain electrodes 216 (ITO converting part).

As is apparent from FIG. 4, the gate interconnection 223 is a Vss bus interconnection supplied with a VSS potential which is a low potential, and is connected to the transparent conductive film 218 via the contact hole part 217b to be further connected to the source/drain interconnection 222 via the contact hole part 217a. The source/drain interconnection 222 becomes the other of the source/drain electrodes 216.

In this preferred embodiment, the color filter layer 260 is provided over almost an entire surface correspondingly to one side (left side in FIG. 1) of the first periphery area PA1 having a frame shape on which the gate line driving circuit 160 is disposed. However, even if the color filter layer 260 is disposed at least only in an area opposed to the gate line driving circuit 160 or only in an area opposed to the contact hole part (ITO converting part) of the gate line driving circuit 160 to which a low voltage is applied, there is achieved an effect of avoiding electrolysis between the counter electrode 250 and the second light shielding layer 240, which makes it possible to suppress melt-out of the second light shielding layer 240.

Figure 9:
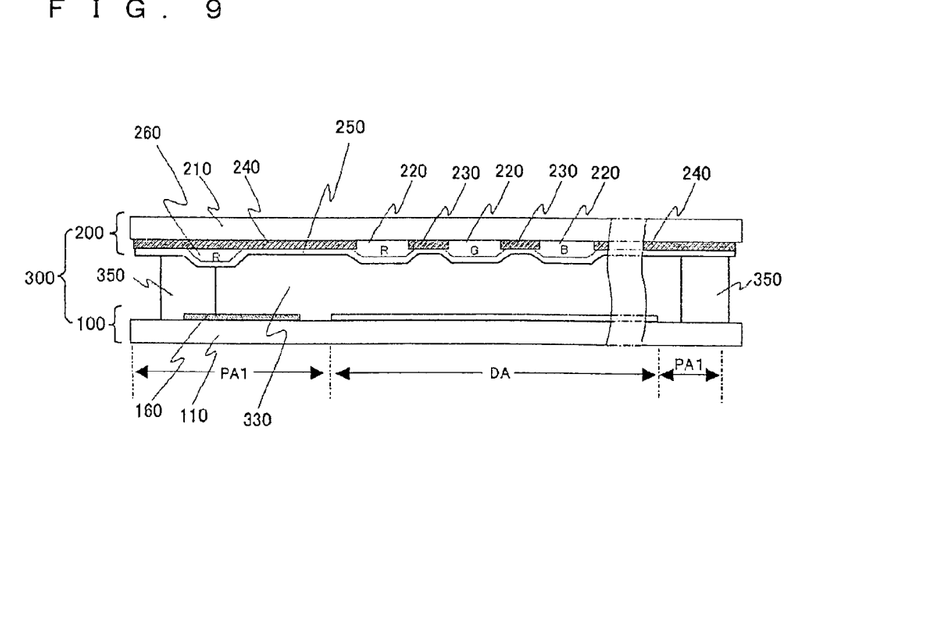
FIG. 9 is a cross-sectional view of a liquid crystal display device according to other preferred embodiment of the first preferred embodiment.

Alternatively, as shown in FIG. 9, the color filter layer 260 may be disposed only in a vicinity of a seal end which is adjacent to the liquid crystal layer 330. In this case, there is no limitation on color material used for the color filter layer 260, and it is possible to use the same color materials as R, G and B pixels. In FIG. 9, the same color material as the R pixel is used.

The melt-out of the light shielding layer of the color filter occurs particularly at the seal end which is adjacent to the liquid crystal layer 330, and thus there is achieved an effect of sufficiently avoiding melt-out of the second light shielding layer even in the arrangement as described above. In a case where the color filter layer 260 is disposed over an entire area of the sealing material 350, an adhesion strength between the color filter layer 260 and the counter electrode (ITO film) 250 is weak, and hence the seal is likely to peel off in some cases. In the preferred embodiment shown in FIG. 9, the color filter layer 260 is disposed only at the seal end which is adjacent to the liquid crystal layer 330, and thus the counter electrode 250 and the second light shielding layer 240 (metal film) which have high adhesion strength are brought into contact with each other, which makes it possible to keep a seal peel strength high.

Second Preferred Embodiment

Figure 10:
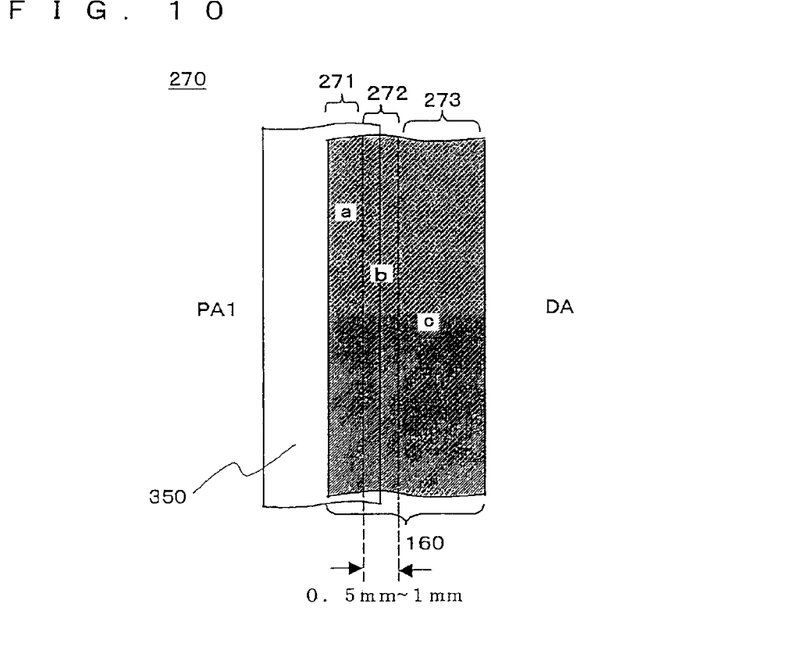
FIG. 10 is a schematic plan view showing a part of a gate line driving circuit according a second preferred embodiment.

FIG. 10 relates to a second preferred embodiment of the present invention, which is a plan view schematically showing a part of a gate line driving circuit periphery area 270 indicated by a chain line in the liquid crystal display device 400 shown in FIG. 1. Here, the gate line driving circuit 160 includes a plurality of signal interconnections, a TFT, a contact hole part (ITO converting part). As shown in FIG. 10, the gate line driving circuit 160 is divided into three, an area a271, an area b272 and an area c273, and is configured such that the TFT, the signal interconnections and the contact hole part (ITO converting part) applied with a Low potential are disposed in the area a271 and the area c273, and that only the TFT and the signal interconnections are disposed and the contact hole part applied with the Low potential is not disposed in the area b272.

Further, the sealing material 350 is formed by being applied onto the array substrate 100 or the color filter substrate 200 by, for example, screen printing or drawing with a dispenser, which is applied such that the seal end side adjacent to the liquid crystal layer 330 is positioned within the area b272 as shown in FIG. 10. Due to, for example, variations in position for applying a sealing material and variations in viscosity of a sealing material, the area b272 needs to have width of 0.5 mm to 1 mm.

According to this preferred embodiment, the seal end adjacent to the liquid crystal layer 330 is disposed in the area b272 in which the contact hole part applied with the Low potential is not formed, which keeps a sufficient distance between the second light shielding layer 240 of the color filter substrate and the transparent conductive film 218 which provides bridge connection between the contact holes applied with a low potential. Accordingly, there is achieved an effect of preventing melt-out of the second light shielding layer 240 due to electrolysis.

Note that this preferred embodiment has a similar effect even in a case where the counter electrode (ITO film) 250 is not formed, on the color filter substrate 200, so as to be opposed to a pixel electrode as in IPS drive system and FFS drive system.

Third Preferred Embodiment

Figure 11:
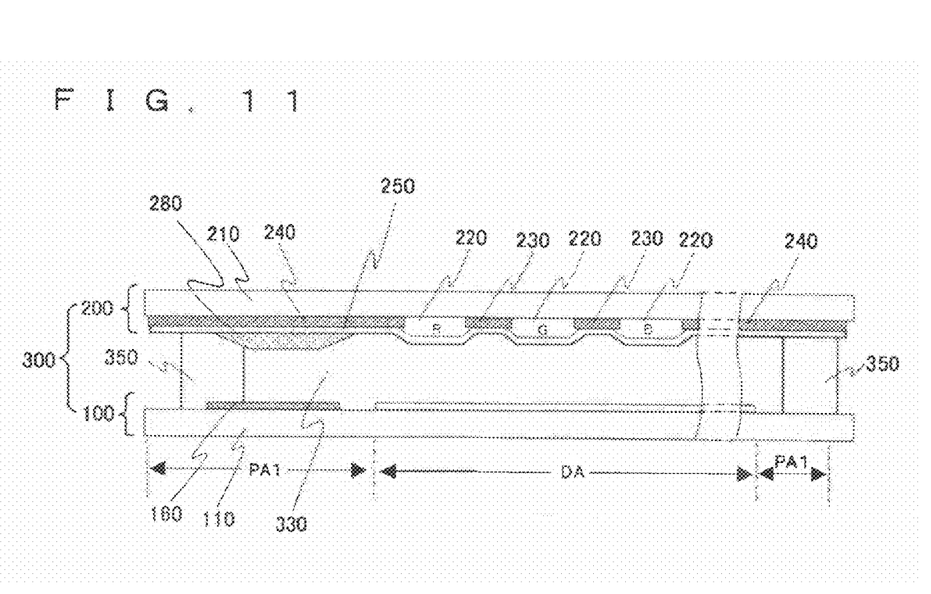
FIG. 11 is a cross-sectional view of a liquid crystal display device according to a third preferred embodiment.

A cross-sectional view of FIG. 11 relates to a third preferred embodiment of the present invention, which is a cross-sectional view taken along the dashed line A-A of FIG. 1 as in the first preferred embodiment described above. In this preferred embodiment, the counter electrode 250 is provided on the second light shielding layer 240, and further, a structure 280 is provided at the seal end adjacent to the liquid crystal layer 330 on the counter electrode 250. The structure 280 is provided at the seal end (on the liquid crystal side) in this manner, whereby a path for electrolysis occurring on a seal end surface becomes longer, which increases a resistance value. As a result, electrolysis is suppressed, which makes it possible to suppress melt-out of the second light shielding layer 240. The same organic material as that of a columnar spacer (not shown) which is formed with a material such as an organic resin film is used for the structure 280 in this preferred embodiment. This columnar spacer is appropriately disposed at a given position within the liquid crystal layer 330 for keeping a cell gap between the array substrate 100 and the color filter substrate 200. Therefore, the structure 280 is formed without difficulty.

A thickness (cell gap) of the liquid crystal layer between the array substrate 100 and the color filter substrate 200 is approximately 5 μm, and thus the structure 280 provides a sufficient effect if a horizontal width thereof is equal to or larger than 50 μm. However, the width of the structure 280 needs to be approximately 0.5 mm to 1 mm due to variations in position for applying a sealing material, variations in viscosity of a scaling material, and the like.

Note that though this preferred embodiment describes the case where the structure 280 is disposed over an entire surface of the driving circuit along the seal end as shown in FIG. 1, which makes it possible to achieve other effect.

That is, the gate electrode 212, the gate interconnections 219 and 223, the source/drain electrodes 216, and the source/drain interconnections 221 and 222 shown in FIG. 8 are normally covered with an insulating film such as a silicon nitride film but, in some cases, there is generated a region (film defect) which is not covered with the insulating film due to a foreign matter or the like. In a case where a continuous operation test is performed in such a state under a high temperature and high humidity environment, due to electrolysis with the counter electrode 250, corrosion of the gate electrode 212, the gate interconnections 219 and 223, the source/drain electrodes 216, and the source/drain interconnections 221 and 222 occurs particularly at the seal end. An effect of suppressing such corrosion is achieved when the structure 280 is disposed over an entire surface of the driving circuit along the seal end.

In a case of taking a measure against melt-out of the second light shielding layer 240, which is opposed to the contact hole part (ITO converting part) applied with the Low potential, as in the second preferred embodiment, it is merely required to dispose the structure 280 only at the position opposed to the contact hole part (ITO converting part) applied with the Low potential.

Further, though this preferred embodiment describes the case where the color filter substrate 200 includes the counter electrode (ITO film) 250, the third preferred embodiment has a similar effect even in a case where the counter electrode (ITO film) 250 is not formed on the color filter substrate 200 so as to be opposed to the pixel electrode as in the IPS drive system and FFS drive system.

Note that though the first to third preferred embodiments describe the example in which a color filter color material or an organic insulating film, which is an organic material, is used as the insulating film which covers the light shielding layer 240, the insulating film is not necessarily formed of an organic material in the present invention, and a similar effect is achieved even with an inorganic insulating film made of, for example, silicon nitride.

Further, though there is imposed no particular limitation on the color filter substrate 200 opposed to the gate line driving circuit 160 in the second preferred embodiment, it is needless to say that the effect is achieved even in a case where an insulating film is provided so as to cover the light shielding film in combination with the descriptions of the first and third preferred embodiments.

Moreover, the first to third preferred embodiments describe the example where the contact hole part (ITO converting part) is configured such that the transparent conductive film 218 provides bridge connection between two independent contact hole parts 217a and 217b. However, two contact holes are not required to be positioned independently from each other, and may have a double structure in which one thereof may be included in the other thereof or have a shape in which parts thereof overlap each other. As long as there is provided a structure for electrically connecting a first metal thin film and a second metal thin film formed on different layers with a transparent conductive film, the above-mentioned effect of preventing melt-out of the light shielding layer is achieved in a similar manner.

While the invention has been shown and described in detail, the foregoing description is in all aspects illustrative and not restrictive. It is therefore understood that numerous modifications and variations can be devised without departing from the scope of the invention.

What is claimed is:

1. A liquid crystal display device, comprising:
an array substrate including a gate line driving circuit comprising a plurality of shift registers disposed in a peripheral area of a display area; and
a color filter substrate opposed to said array substrate,
said array substrate and said color filter substrate being bonded to each other so as to sandwich a liquid crystal layer therebetween with a sealing member,
said gate line driving circuit including contact hole parts,
said color filter substrate including a light shielding layer formed of a metal material,
wherein at least a region opposed to said contact hole parts of said gate line driving circuit on said array substrate includes an insulating film formed so as to cover said light shielding layer of the color filter substrate.

2. The liquid crystal display device according to claim 1, wherein said insulating film includes the same material as a color filter colored layer.

3. The liquid crystal display device according to claim 1, wherein:
said color filter substrate includes a counter electrode connected to said light shielding layer; and
said contact hole parts have a potential at least lower than a potential applied to said counter electrode.

4. The liquid crystal display device according to claim 1, wherein the region of said array substrate in which said insulating film is formed is positioned in one of a region so as to overlap said sealing member and a region in a vicinity of a seal end.

5. The liquid crystal display device according to claim 1, wherein said insulating film includes the same material as a columnar spacer disposed at a given position in the liquid crystal layer.

6. The liquid crystal display device according to claim 1, wherein said insulating film is an organic resin film.

7. The liquid crystal display device according to claim 1, wherein a transistor forming said gate line driving circuit is an amorphous silicon thin film transistor.

8. A liquid crystal display device, comprising:
an array substrate including a gate line driving circuit; and
a color filter substrate opposed to said array substrate, said array substrate and said color filter substrate being bonded to each other so as to sandwich a liquid crystal layer therebetween with a sealing material, said gate line driving circuit including contact hole parts, said color filter substrate including a light shielding layer formed of a metal material, wherein:

a region including said gate line driving circuit formed therein is divided into a region including said contact hole parts and a region free from said contact hole parts; and an end of said sealing material adjacent to the liquid crystal layer is disposed in the region free from said contact hole parts.

9. The liquid crystal display device according to claim 8, wherein:

said color filter substrate includes a counter electrode connected to said light shielding layer; and said contact hole parts have a potential at least lower than a potential applied to said counter electrode.

10. The liquid crystal display device according to claim 8, wherein a transistor forming said gate line driving circuit is an amorphous silicon thin film transistor.

\* \* \* \* \*